Figures 1, 2:
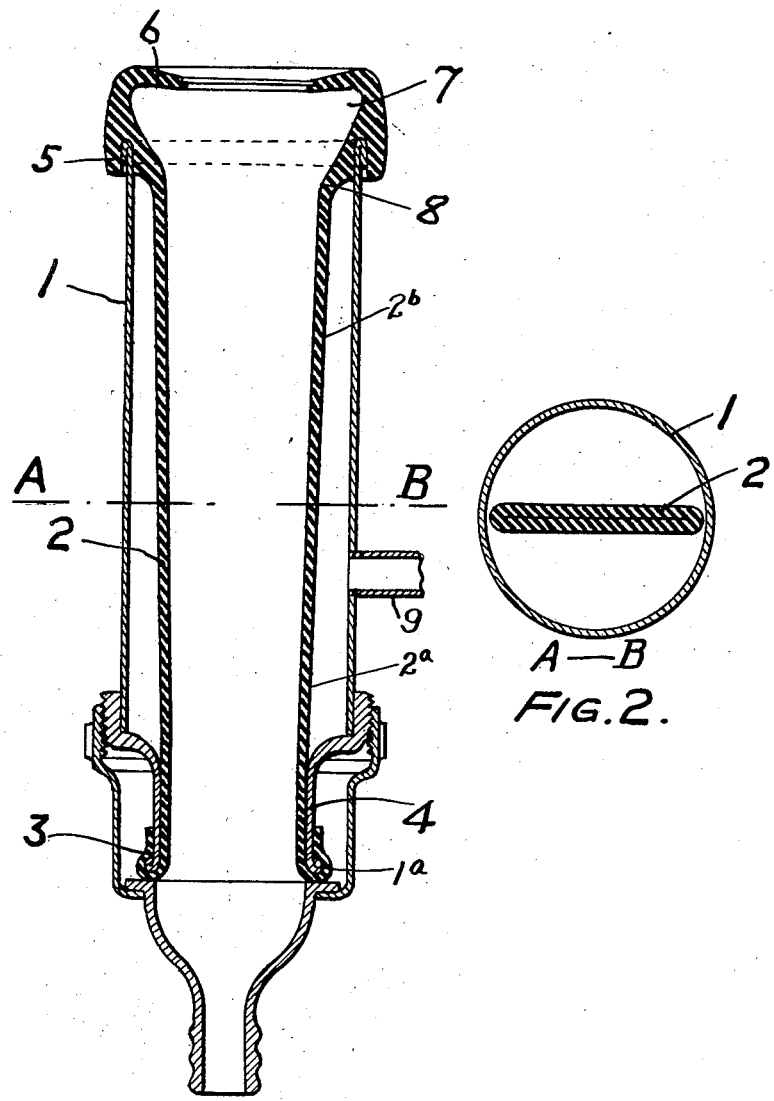

April 4, 1950     E. T. JANSSON     2,502,956
TEAT CUP
Filed July 14, 1945

INVENTOR.
Ernst Tage Jansson

Patented Apr. 4, 1950

2,502,956

UNITED STATES PATENT OFFICE 2,502,956

TEAT CUP

Ernst Tage Jansson, Stockholm, Sweden, assignor to Aktiebolaget Separator, Stockholm, Sweden, a corporation of Sweden Application July 14, 1945, Serial No. 605,098
In Sweden August 30, 1944

4 Claims. (Cl. 31—85)

A teat cup is usually composed of an outer rigid metal shell and an inner shell of elastic material, a so-called teat cup liner. During operation, the space between the outer shell and the teat cup liner is intermittently evacuated, whereas the chamber formed by the teat cup liner is then subjected to constant vacuum. When the teat cup liner is compressed around the teat during the period of full pressure, the lower part of the liner, which is usually below the teat, is pressed together without the metal shell hindering it. The chamber within the teat cup liner is therefore closed at the place where the liner is pressed together, so that the air present around the teat is not sucked off by the vacuum. The upper part of the teat cup is usually so shaped as to permit it to be tightly applied to the teat, but owing to unevenness of the skin of the teat, air often leaks between the teat and the teat cup liner. Since the air cannot pass on to the vacuum system after the liner has been pressed together, the air pressure increases during the period of full pressure around the teat, and consequently the vacuum around the teat is reduced. Now, the means used for keeping the teat cup fixed to the teat is just the vacuum, and if this is reduced the teat cup will have a tendency to work loose. When applying the teat cup to the teat prior to starting the milking the teat is sucked into the teat cup, and a collar projecting inwards assists in keeping the teat fixed in this position. If the collar is to keep the teat fixed in the teat cup with a sufficient force, the diameter of the opening formed by the collar must be smaller than the inner diameter of the upper part of the teat cup liner. If this condition is to be satisfied, the diameter of the upper part of the teat cup liner must be rather large if the opening in the collar is to be sufficient for big teats.

From considerations of space it is however desirable to keep the diameter of the outer shell within certain limits. The problem is thus to get a sufficiently large diameter at the upper part of the teat cup liner and simultaneously to keep the diameter of the metal shell within the desired limits.

My invention relates to an improved solution of this problem, and contemplates constructing the teat cup liner narrowing downwards, and so choosing the relation between the diameter of the metal shell and that of the teat cup liner that the teat cup liner, without exerting a pressure on the inner wall of the metal shell, can be compressed until its lower part but not its upper part becomes flat.

The accompanying drawing shows by way of example one embodiment of the invention, Fig. 1 being a longitudinal cross-sectional view and Fig. 2 being a transverse cross-sectional view through a teat cup constructed according to the invention.

In the metal shell 1 a rubber liner 2 is fixed, which in its unloaded state is circular like the teat cup. The rubber liner should be fixed in the teat cup under axial tension, and its lower end 3 should be folded around and fixed to the edge 1a of the prolongation of the metal shell 1.

Fig. 2 shows a section of the teat cup on the line A—B of Fig. 1, taken as will be seen from the drawing at about midheight of the teat cup. As indicated in the figure, the rubber liner, when flattened, will here just have room enough in the shell. Above the section line A—B in Fig. 1 where the diameter of the rubber liner (the shortest distance between opposite sides of the undistorted liner, taken along a straight line through its central axis) is larger, the liner cannot be pressed together as shown in Fig. 2, because the outer ends of the flat portion would contact with the metal shell. The liner is thus prevented from assuming a flat shape. At this height, however, the teat normally occupies the interior of the liner and the teat, too, would thus prevent the liner from being pressed flat. Owing to the teat, the flat shape may therefore normally be obtained only in the lower part 2a of the teat cup where there is no teat. At those parts at which the teat more or less fills out the interior of the rubber liner and thus prevents this from being pressed flat, the deformation of the compressed liner is reduced to such a degree that it will nowhere contact with the wall of the metal shell. The rubber liner may therefore have a larger diameter at the parts enclosing the teat than below the teat, without risk of the liner contacting with and pressing against the wall of the shell. Such contacting should be avoided, because it has been found that the rubber liner is exposed to strong wear at the place of contact, entailing a substantial reduction of its life.

The upper part 2b of the rubber liner 2 is wider and provided with a collar 5, embracing the upper edge of the metal shell, and also with an inwardly projecting collar 6, designed to make a tight joint with the teat and thereby to keep the teat cup fixed to the teat when the vacuum ceases.

Immediately below the collar 6 the rubber liner has its largest diameter and forms an annular widened portion 7, the diameter of which may be equal to or larger than that of the metal shell. Below the wider portion 7 the diameter of the rubber liner is smaller, although still larger than the diameter of the opening at the collar 6.

At the upper edge of the metal shell, at 8, the shape of the rubber liner is changed to a nearly cylindrical but slightly conical portion extending down to the part 4. The conicity and the diameters of the liner are so chosen that on compressing the rubber liner it can be completely flattened without coming into contact with the shell, at the lower third or half of that part of the rubber liner which is fixed in the shell but not thereabove.

It will be understood that the space between the outer shell 1 and the liner 2 is subjected alternately to relatively high and low pneumatic pressures in the operation of the teat cup, by means of a suitable pulsator connected to this space, for example, through a tube 9 leading from the shell. The lower and upper parts or end portions 2a and 2b, respectively, of the liner are, of course, flexed by the pneumatic pulsations.

I claim:

1. In a teat cup comprising an outer cylindrical shell of rigid material and an inner elastic liner providing an inner teat cup chamber adapted to be subjected to a constant relatively low fluid pressure and forming with the shell an outer annular pulsation chamber adapted to be subjected to alternate high and low fluid pressures and in which the liner has upper and lower end portions secured to the shell and in which the liner when undistorted is of gradually decreasing diameters from adjacent its upper end portion toward its lower end portion, the improvement in which the gradually decreasing diameters of the liner are so proportioned to the diameter of the shell that when the outer chamber is subjected to high fluid pressure and the lower part of the liner below its teat-enclosing portion is compressed into a flat shape the maximum width of the flattened part of the liner will be less than the minimum diameter of the adjacent inner wall of the shell, the diameters of the liner relative to the diameter of the shell being such that when the outer chamber is subjected to fluid pressure the upper part of the liner adapted to enclose the teat, if not engaged with a teat, would, throughout a substantial part of its length, contact with the wall of the shell in approaching a completely flat condition.

2. A teat cup comprising an outer rigid shell and an inner flexible liner, the liner having upper and lower parts and being designed to be intermittently compressed around and below a teat during operation, in which the liner is secured in the shell, in which an outer circumference of that upper part of the liner which comprises not less than half its length is greater than twice the inner diameter of the shell, and in which an outer circumference of that lower part of the liner which comprises not over half its length is less than twice the inner diameter of the shell.

3. A teat cup comprising an outer rigid shell and an inner flexible liner, the liner having upper and lower parts and being designed to be intermittently compressed around and below a teat during operation, in which the liner is secured in the shell, in which an outer circumference of that upper part of the liner which comprises substantially over half, and not substantially over two-thirds, of its length is greater than twice the inner diameter of the shell, and in which an outer circumference of that lower part of the liner which comprises substantially less than half, but not substantially less than one-third, of its length is less than twice the inner diameter of the shell.

4. A teat cup as defined in claim 2, in which said liner has upper and lower ends and gradually increases in internal diameter from adjacent its lower end to a point near its upper end, the interior of the liner above said point widening relatively abruptly, the liner having at its upper end a collar extending inwardly over said abruptly widened portion and having a central opening of substantially smaller diameter than the internal diameter of the liner at said point.

ERNST TAGE JANSSON.

REFERENCES CITED

The following references are of record in the file of this patent:

UNITED STATES PATENTS

| Number | Name | Date |
|---|---|---|
| 1,945,386 | Stampsen | Jan. 30, 1934 |

FOREIGN PATENTS

| Number | Country | Date |
|---|---|---|
| 7,796 | Great Britain | Apr. 3, 1907 |// Acc. Dec. 19, 1907